(12) United States Patent
Vesely et al.

(10) Patent No.: US 7,907,167 B2
(45) Date of Patent: Mar. 15, 2011

(54) THREE DIMENSIONAL HORIZONTAL PERSPECTIVE WORKSTATION

(75) Inventors: Michael A. Vesely, Santa Cruz, CA (US); Nancy L. Clemens, Santa Cruz, CA (US)

(73) Assignee: Infinite Z, Inc., Campbell, CA (US)

(*) Notice: Subject to any disclaimer, the term of this patent is extended or adjusted under 35 U.S.C. 154(b) by 1343 days.

(21) Appl. No.: 11/429,829

(22) Filed: May 8, 2006

(65) Prior Publication Data
US 2006/0250392 A1    Nov. 9, 2006

Related U.S. Application Data

(60) Provisional application No. 60/679,633, filed on May 9, 2005.

(51) Int. Cl.
*H04N 13/04* (2006.01)
*G09G 5/00* (2006.01)

(52) U.S. Cl. .......................................... 348/51; 345/1.1

(58) Field of Classification Search ............... 348/51, 348/52, 54, 59; 345/1.1
See application file for complete search history.

(56) References Cited

U.S. PATENT DOCUMENTS

| | | |
|---|---|---|
| 1,592,034 A | 7/1926 | Macy et al. |
| 4,182,053 A | 1/1980 | Allen et al. |
| 4,291,380 A | 9/1981 | Rohner |
| 4,677,576 A | 6/1987 | Berlin, Jr. et al. |
| 4,763,280 A | 8/1988 | Robinson et al. |
| 4,795,248 A | 1/1989 | Okada et al. |
| 4,984,179 A | 1/1991 | Waldern et al. |
| 5,079,699 A | 1/1992 | Tuy et al. |
| 5,168,531 A | 12/1992 | Sigel |
| 5,237,647 A | 8/1993 | Roberts et al. |
| 5,264,964 A | 11/1993 | Faris |
| 5,276,785 A | 1/1994 | Mackinlay et al. |
| 5,287,437 A | 2/1994 | Deering |
| 5,327,285 A | 7/1994 | Faris |
| 5,361,386 A | 11/1994 | Watkins et al. |
| 5,381,127 A | 1/1995 | Khieu |
| 5,381,158 A | 1/1995 | Takahara et al. |
| 5,400,177 A | 3/1995 | Petitto et al. |
| 5,438,623 A | 8/1995 | Begault |
| 5,515,079 A | 5/1996 | Hauck |
| 5,537,144 A | 7/1996 | Faris |
| 5,574,836 A | 11/1996 | Broemmelsiek |
| 5,652,617 A | 7/1997 | Barbour |
| 5,659,969 A | 8/1997 | Butler et al. |
| 5,686,975 A | 11/1997 | Lipton |

(Continued)

OTHER PUBLICATIONS

Notification of transmittal of the international search report and the written opinion of the international searching authority, or the declaration PCTIZ010—PCT/US06/17598.

(Continued)

*Primary Examiner* — Lin Ye
*Assistant Examiner* — Amy Hsu

(57) ABSTRACT

The present invention discloses a horizontal perspective workstation comprising at least two display surfaces, one being substantially horizontal for displaying 3D horizontal perspective images, and one being substantially vertical for text or conventional images such as 2D images, or central perspective images. The horizontal display surface is typically positioned directly in front of the user, and at a height of about a desktop surface so that the user can have about a 45° angle looking. The vertical display surface is also positioned in front of the user and preferably behind and above the horizontal display surface.

48 Claims, 7 Drawing Sheets

U.S. PATENT DOCUMENTS

| | | | |
|---|---|---|---|
| 5,696,892 | A | 12/1997 | Redmann et al. |
| 5,745,164 | A | 4/1998 | Faris |
| 5,795,154 | A | 8/1998 | Woods |
| 5,844,717 | A | 12/1998 | Faris |
| 5,862,229 | A | 1/1999 | Shimizu |
| 5,880,733 | A | 3/1999 | Horvitz et al. |
| 5,880,883 | A * | 3/1999 | Sudo ............................ 359/462 |
| 5,945,985 | A | 8/1999 | Babin et al. |
| 5,956,046 | A | 9/1999 | Kehlet et al. |
| 6,028,593 | A | 2/2000 | Rosenberg et al. |
| 6,034,717 | A | 3/2000 | Dentinger et al. |
| 6,064,354 | A | 5/2000 | DeLuca |
| 6,069,649 | A | 5/2000 | Hattori |
| 6,072,495 | A | 6/2000 | Watanabe et al. |
| 6,100,903 | A | 8/2000 | Goettsche |
| 6,108,005 | A | 8/2000 | Starks et al. |
| 6,125,337 | A | 9/2000 | Rosenberg et al. |
| 6,134,506 | A | 10/2000 | Rosenberg et al. |
| 6,139,434 | A | 10/2000 | Miyamoto et al. |
| 6,163,336 | A | 12/2000 | Richards |
| 6,195,205 | B1 | 2/2001 | Faris |
| 6,198,524 | B1 | 3/2001 | Osgood |
| 6,208,346 | B1 | 3/2001 | Washio et al. |
| 6,211,848 | B1 | 4/2001 | Plesniak et al. |
| 6,226,008 | B1 | 5/2001 | Watanabe et al. |
| 6,241,609 | B1 | 6/2001 | Rutgers |
| 6,252,707 | B1 | 6/2001 | Kleinberger et al. |
| 6,317,127 | B1 | 11/2001 | Daily et al. |
| 6,346,938 | B1 | 2/2002 | Chan et al. |
| 6,351,280 | B1 | 2/2002 | Benton |
| 6,373,482 | B1 | 4/2002 | Migdel et al. |
| 6,384,971 | B1 | 5/2002 | Faris |
| 6,392,689 | B1 | 5/2002 | Dolgoff |
| 6,452,593 | B1 | 9/2002 | Challener |
| 6,478,432 | B1 | 11/2002 | Dyner |
| 6,483,499 | B1 | 11/2002 | Li et al. |
| 6,529,210 | B1 | 3/2003 | Rees |
| 6,556,197 | B1 | 4/2003 | Van Hook et al. |
| 6,593,924 | B1 | 7/2003 | Lake et al. |
| 6,614,427 | B1 | 9/2003 | Aubrey |
| 6,618,049 | B1 | 9/2003 | Hansen |
| 6,643,124 | B1 | 11/2003 | Wilk |
| 6,680,735 | B1 | 1/2004 | Seller et al. |
| 6,690,337 | B1 | 2/2004 | Mayer et al. |
| 6,715,620 | B2 | 4/2004 | Taschek |
| 6,734,847 | B1 * | 5/2004 | Baldeweg et al. ............. 345/419 |
| 6,753,847 | B2 * | 6/2004 | Kurtenbach et al. ........... 345/156 |
| 6,827,446 | B2 | 12/2004 | Beckett et al. |
| 6,882,953 | B2 | 4/2005 | D'Hooge et al. |
| 6,898,307 | B1 | 5/2005 | Harrington |
| 6,912,490 | B2 | 6/2005 | Dodge |
| 6,943,754 | B2 | 9/2005 | Aughey et al. |
| 6,956,576 | B1 | 10/2005 | Deering et al. |
| 6,987,512 | B1 | 1/2006 | Robertson et al. |
| 7,102,635 | B2 | 9/2006 | Shih et al. |
| 7,161,615 | B2 * | 1/2007 | Pretzer et al. ................. 348/143 |
| 7,236,618 | B1 | 6/2007 | Chui et al. |
| 7,249,952 | B2 | 7/2007 | Ranta et al. |
| 7,321,682 | B2 * | 1/2008 | Tooyama et al. .............. 382/154 |
| 7,353,134 | B2 | 4/2008 | Cirielli |
| 7,477,232 | B2 | 1/2009 | Serra et al. |
| 7,583,252 | B2 | 9/2009 | Kurtenbach et al. |
| 7,796,134 | B2 * | 9/2010 | Vesely et al. ................. 345/427 |
| 2002/0041327 | A1 | 4/2002 | Hildreth |
| 2002/0080094 | A1 | 6/2002 | Biocca et al. |
| 2002/0113752 | A1 | 8/2002 | Sullivan et al. |
| 2002/0140698 | A1 | 10/2002 | Robertson et al. |
| 2002/0163482 | A1 | 11/2002 | Sullivan |
| 2002/0174121 | A1 | 11/2002 | Clemie |
| 2002/0176636 | A1 | 11/2002 | Shefi |
| 2002/0186221 | A1 | 12/2002 | Bell |
| 2002/0190961 | A1 | 12/2002 | Chen |
| 2003/0006943 | A1 | 1/2003 | Sato et al. |
| 2003/0011535 | A1 | 1/2003 | Kukuchi et al. |
| 2003/0085866 | A1 | 5/2003 | Bimber et al. |
| 2003/0085896 | A1 | 5/2003 | Freeman |
| 2003/0103139 | A1 * | 6/2003 | Pretzer et al. ................. 348/143 |
| 2003/0227470 | A1 | 12/2003 | Genc et al. |
| 2003/0231177 | A1 | 12/2003 | Montagnese et al. |
| 2004/0037459 | A1 | 2/2004 | Dodge |
| 2004/0066376 | A1 | 4/2004 | Donath et al. |
| 2004/0066384 | A1 | 4/2004 | Ohba |
| 2004/0125103 | A1 | 7/2004 | Kaufman et al. |
| 2004/0130525 | A1 | 7/2004 | Suchocki |
| 2004/0135744 | A1 | 7/2004 | Bimber et al. |
| 2004/0135780 | A1 | 7/2004 | Nims |
| 2004/0164956 | A1 | 8/2004 | Yamaguchi et al. |
| 2004/0169649 | A1 | 9/2004 | Suzuki |
| 2004/0169670 | A1 * | 9/2004 | Uehara et al. ................. 345/697 |
| 2004/0196359 | A1 | 10/2004 | Blackham |
| 2004/0208358 | A1 | 10/2004 | Tooyama et al. |
| 2004/0227703 | A1 | 11/2004 | Lamvik et al. |
| 2004/0249303 | A1 | 12/2004 | Serra |
| 2005/0024331 | A1 | 2/2005 | Berkley et al. |
| 2005/0030308 | A1 | 2/2005 | Takaki |
| 2005/0057579 | A1 | 3/2005 | Young |
| 2005/0093859 | A1 | 5/2005 | Sumanaweera et al. |
| 2005/0093876 | A1 | 5/2005 | Snyder et al. |
| 2005/0151742 | A1 | 7/2005 | Hong et al. |
| 2005/0156881 | A1 | 7/2005 | Trent et al. |
| 2005/0162447 | A1 | 7/2005 | Tigges |
| 2005/0195276 | A1 * | 9/2005 | Lipton et al. .................... 348/59 |
| 2005/0219240 | A1 | 10/2005 | Vesely et al. |
| 2005/0219693 | A1 | 10/2005 | Hartkop et al. |
| 2005/0219694 | A1 | 10/2005 | Vesely et al. |
| 2005/0219695 | A1 | 10/2005 | Vesely et al. |
| 2005/0231532 | A1 | 10/2005 | Suzuki et al. |
| 2005/0248566 | A1 | 11/2005 | Vesely et al. |
| 2005/0264558 | A1 | 12/2005 | Vesely et al. |
| 2005/0264559 | A1 | 12/2005 | Vesely et al. |
| 2005/0264651 | A1 * | 12/2005 | Saishu et al. .................... 348/51 |
| 2005/0264857 | A1 | 12/2005 | Vesely et al. |
| 2005/0264858 | A1 | 12/2005 | Vesely et al. |
| 2005/0275913 | A1 | 12/2005 | Vesely et al. |
| 2005/0275914 | A1 | 12/2005 | Vesely et al. |
| 2005/0275915 | A1 | 12/2005 | Vesely et al. |
| 2005/0281411 | A1 | 12/2005 | Vesely et al. |
| 2006/0126926 | A1 | 6/2006 | Vesely et al. |
| 2006/0126927 | A1 | 6/2006 | Vesely et al. |
| 2006/0170652 | A1 | 8/2006 | Bannai et al. |
| 2006/0221071 | A1 | 10/2006 | Vesely et al. |
| 2006/0227151 | A1 | 10/2006 | Bannai |
| 2006/0250390 | A1 | 11/2006 | Vesely et al. |
| 2006/0250391 | A1 | 11/2006 | Vesely et al. |
| 2006/0250392 | A1 | 11/2006 | Vesely et al. |
| 2006/0252978 | A1 | 11/2006 | Vesely et al. |
| 2006/0252979 | A1 | 11/2006 | Vesely et al. |
| 2007/0035511 | A1 | 2/2007 | Banerjee et al. |
| 2007/0040905 | A1 | 2/2007 | Vesely et al. |
| 2007/0043466 | A1 | 2/2007 | Vesely et al. |
| 2007/0109296 | A1 | 5/2007 | Sakagawa et al. |

OTHER PUBLICATIONS

Agrawala, M., et al., Proceedings of the 24th annual conference on Computer Graphics and Interactive Techniques, ACM Press/Addison-Wesley Publishing Co., 1997, The two-user Responsive Workbench; support for collaboration through individual views of a shared space, pp. 327-332.

Arvo, J., et al., Resposive Workbench: Algorithms and Methodologies [online], California Institute of Technology, Aug. 1998, [retrieved on Aug. 17, 2007]. Retrieved from the Internet; <URL:http://www.gg.caltech.edu/workbench/intro.html>.

Beardsley, P., Important concepts from projective geometry [online], University of Edinburgh, Jan. 1995, [retrieved on Sep. 24, 2007]. Retrieved from the Internet: <URL:http://homepages.inf.ed.ac.uk/rbf/CVonline/LOCAL_COPIES/BEARDSLEY/beardsley.html>.

Cutler, L., et al., Proceedings of the 1997 symposium on Interactive 3D graphics, ACM, 1997, Two-handed direct manipulation on the responsive workbench, pp. 107-114.

Frohlich, B., et al., (stills from video) Physically-based manipulation on the responsive workbench [online], Stanford University, Jan. 2000, [retrieved on Dec. 19, 2007]. Retrieved from the Internet: URL:http://graphics.stanford.edu/papers/phywrkbnch/yr2000.gt>.

Frohlich, B., et al., Computers in Biology and Medicine, Elsevier

Science, Mar. 1995, The Responsive Workbench: A virtual working environment for physicians, vol. 25 No. 2, pp. 301-308.

Frohlich, B., et al., Virtual Reality, 2000. Proceedings, IEEE, Jan. 2000, Physically-based manipulation on the responsive workbench, Issue 2000, pp. 5-11.

Girling, A., Stereoscopic Drawing A Theory of 3-D Vision and its application to Stereoscopic Drawing, Arthur N. Girling, UK, 1990, Free Standing Projection, Chap. 2, pp. 19-28.

Hanrahan, P., et al., The Responsive Workbench [online], Stanford University, Nov. 1996, [retrieved on Aug. 17, 2007]. Retrieved from the Internet :<URL:http://www-graphics.stanford.edu/~hanrahan/talks/rwb/slides/>.

Hughes, S., An Introduction to Making Phantograms [online], Steve Hughes, Jul. 2004, [retrieved on Aug. 8, 2007]. Retrieved from the Internet:<URL:http://www.shughes.org/phantograms/Documents/Intro%20to%20Phantograms.pdf>.

United States Searching Authority; International Search Report for PCT/US2005/011252; May 30, 2006; US.

United States Searching Authority; International Search Report for PCT/US2005/011253; Jun. 2, 2006; US.

United States Searching Authority; International Search Report for PCT/US2005/011254; Mar. 26, 2007; US.

United States Searching Authority; International Search Report for PCT/US2005/011255; Mar. 2, 2006; US.

United States Searching Authority; International Search Report for PCT/US2005/019068; Feb. 27, 2006; US.

United States Searching Authority; International Search Report for PCT/US2005/019069; Feb. 22, 2006; US.

United States Searching Authority; International Search Report for PCT/US2005/047659; Dec. 4, 2006; US.

United States Searching Authority; International Search Report for PCT/US2005/017596; Nov. 28, 2006; US.

Vesely, et al.; U.S. Appl. No. 11/724,523, filed Mar. 14, 2007; entitled: Horizontal perspective polarizing media.

Vesely, et al.; U.S. Appl. No. 11/724,524, filed Mar. 14, 2007; entitled: Shifted pixel polarized stereoscopic display.

Vesely, et al.; U.S. Appl. No. 11/724,525, filed Mar. 14, 2007; entitled: Composite pointer for stereoscopic simulation.

Vesely, M., IZ Demo [disk], Infinite Z, 2003, [retrieved on Jan. 11, 2008].

William Bares, Scott McDermott, Christine Boudreaux, and Somying Thainimit; "Virtual 3D Camera Composition from Frame Contraints"; Univerisity of Louisiana at Lafayette; 2000; 10 pages.

* cited by examiner

THREE DIMENSIONAL HORIZONTAL PERSPECTIVE WORKSTATION

This application claims priority from U.S. provisional application Ser. No. 60/679,633, filed May 9, 2005, entitled "Three dimensional horizontal perspective workstation", which is incorporated herein by reference.

FIELD OF INVENTION

This invention relates to a three-dimensional workstation system, and in particular, to a multiple monitor hands-on computer simulator system capable of operator interaction.

BACKGROUND OF THE INVENTION

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Ever since humans began to communicate through pictures, they faced a dilemma of how to accurately represent the three-dimensional world they lived in. Sculpture was used to successfully depict three-dimensional objects, but was not adequate to communicate spatial relationships between objects and within environments. To do this, early humans attempted to "flatten" what they saw around them onto two-dimensional, vertical planes (e.g. paintings, drawings, tapestries, etc.). Scenes where a person stood upright, surrounded by trees, were rendered relatively successfully on a vertical plane. But how could they represent a landscape, where the ground extended out horizontally from where the artist was standing, as far as the eye could see?

The answer is three dimensional illusions. The two dimensional pictures must provide a number of cues of the third dimension to the brain to create the illusion of three dimensional images. This effect of third dimension cues can be realistically achievable due to the fact that the brain is quite accustomed to it. The three dimensional real world is always and already converted into a two dimensional (e.g. height and width) projected image at the retina, a concave surface at the back of the eye. And from this two dimensional image, the brain, through experience and perception, generates the depth information to form the three dimensional visual image from two types of depth cues: monocular (one eye perception) and binocular (two eye perception). In general, binocular depth cues are innate and biological while monocular depth cues are learned and environmental.

Perspective drawing, together with relative size, is most often used to achieve the illusion of three dimensional depth and spatial relationships on a flat (two dimensional) surface, such as paper or canvas. Through perspective, three dimensional objects are depicted on a two dimensional plane, but "trick" the eye into appearing to be in three dimensional space. The various types of perspectives are military, cavalier, isometric, and dimetric, as shown at the top of FIG. 1.

Of special interest is the most common type of perspective, called central perspective, shown at the bottom left of FIG. 1. Central perspective, also called one-point perspective, is the simplest kind of "genuine" perspective construction, and is often taught in art and drafting classes for beginners. FIG. 2 further illustrates central perspective. Using central perspective, the chess board and chess pieces look like three dimensional objects, even though they are drawn on a two dimensional flat piece of paper. Central perspective has a central vanishing point, and rectangular objects are placed so their front sides are parallel to the picture plane. The depth of the objects is perpendicular to the picture plane. All parallel receding edges run towards a central vanishing point. The viewer looks towards this vanishing point with a straight view. When an architect or artist creates a drawing using central perspective, he must use a single-eye view. That is, the artist creating the drawing captures the image by looking through only one eye, which is perpendicular to the drawing surface.

The vast majority of images, including central perspective images, are displayed, viewed and captured in a plane perpendicular to the line of vision. Viewing the images at an angle different from 90° would result in image distortion, meaning a square would be seen as a rectangle when the viewing surface is not perpendicular to the line of vision.

Central perspective is employed extensively in 3D computer graphics, for a myriad of applications, such as scientific, data visualization, computer-generated prototyping, special effects for movies, medical imaging, and architecture, to name just a few. One of the most common and well-known 3D computing applications is 3D gaming, which is used here as an example, because the core concepts used in 3D gaming extend to all other 3D computing applications.

There is a little known class of images called "horizontal perspective" where the image appears distorted when viewing head on, but displays a three dimensional illusion when viewing from the correct viewing position. In horizontal perspective, the angle between the viewing surface and the line of vision is preferably 45°, but can be almost any angle, and the viewing surface is preferably horizontal (thus the name "horizontal perspective"), but can be any surface, as long as the line of vision forms a non-perpendicular angle to it.

Horizontal perspective images offer realistic three dimensional illusions, but are little known primarily due to the narrow viewing location (the viewer's eyepoint has to coincide precisely with the image projection eyepoint) and the complexity involved in projecting the two dimensional image or the three dimension model into the horizontal perspective image.

The generation of horizontal perspective images requires considerably more expertise to create than conventional perpendicular images. The conventional perpendicular images can be produced directly from the viewer or camera point. One need simply open one's eyes or point the camera in any direction to obtain the images. Further, with much experience in viewing three dimensional depth cues from perpendicular images, viewers can tolerate a significant amount of distortion generated by the deviations from the camera point. In contrast, the creation of a horizontal perspective image does require much manipulation. Conventional cameras, by projecting the image into the plane perpendicular to the line of sight, would not produce a horizontal perspective image. Making a horizontal drawing requires much effort and is very time consuming. Further, since humans have limited experience with horizontal perspective images, the viewer's eye must be positioned precisely where the projection eyepoint point is in order to avoid image distortion. And therefore horizontal perspective, with its difficulties, has received little attention.

SUMMARY OF THE INVENTION

The present invention discloses a horizontal perspective workstation employing a horizontal perspective display with a computer system. The personal computer is perfectly suitable for horizontal perspective display since it is designed for the operation of one person, and the computer, with its powerful microprocessor, is well capable of rendering various horizontal perspective images to the viewer. Further, horizontal perspective offers open space display of 3D images, thus allowing the hands-on interaction of end users. Together with binaural or three dimensional audio, the horizontal perspective workstation can offer a realistic simulation of reality. Furthermore, with the addition of user biofeedback, the horizontal perspective workstation can also tailor the simulation to suit a particular user.

The present invention horizontal perspective workstation comprises at least two display surfaces, one being substantially horizontal for displaying 3D horizontal perspective images, and one being substantially vertical for text or conventional images such as 2D images, or central perspective images. The horizontal display surface is typically positioned directly in front of the user, and at a height of about a desktop surface so that the user can have about a 45° angle looking. The vertical display surface is also positioned in front of the user and preferably behind and above the horizontal display surface. The vertical display surface can be positioned directly in front or can be positioned to the left or right of the user, and preferably mounted on a moving or rotational platform so that the user can adjust its location for maximizing comfort. The horizontal and vertical display surfaces can be any display surfaces, for example, a CRT (cathode ray tube) monitor, a LCD (liquid crystal display) monitor, or a front projection or a back projection screen or surface with a plurality of projectors.

The horizontal perspective workstation further comprises a computer system with standard peripheral devices such as a keyboard, a mouse, a trackball, a stylus, a tablet, a camera, a scanner, or a printer. The connections can be wired or wireless. The positions of these peripheral devices are flexible and usually arranged for achieving the user's support and comfort.

While one eye view of 3D horizontal perspective images is possible, stereoscopic viewing is preferable. For stereoscopic viewing, the two eyes of the user need to see different projected images on the horizontal perspective display through various methods such as shutter glasses, red-and-blue eyeglasses, lenticular glasses or polarizing glasses. The preferred method is polarizing glasses where the horizontal perspective displays images and the user's eyes are respectively polarized (circularly polarized or preferably linearly polarized), thus the left eye only sees the left images and the right eye only sees the right images. If the vertical display is also polarized (as in the case of LCD monitor), the polarization needs to be adjusted so that both eyes can see the vertical images.

The horizontal perspective workstation can further comprise a binaural or 3D audio system to provide realistic sound simulation. The horizontal perspective workstation can also comprise various biofeedback devices such as brain wave, blood pressure, heart beat, respiration, perspiration, skin conductance, body temperature, muscle tension measurements and simulators for inputs and output with the users.

Further, the horizontal perspective workstation can comprise curvilinear blending display surfaces to merge the various images. The horizontal perspective workstation can adjust the images to accommodate the position of the viewer. By changing the displayed images to keep the camera eyepoint of the horizontal perspective and central perspective images in the same position as the viewer's eyepoint, the viewer's eye is always positioned at the proper viewing position to perceive the three dimensional illusion, thus minimizing the viewer's discomfort and distortion. The display can accept manual input such as a computer mouse, trackball, joystick, tablet, etc. to re-position the horizontal perspective images. The display can also automatically re-position the images based on an input device automatically providing the viewer's viewpoint location. The horizontal perspective workstation can provide a simulator system by allowing the user to manipulate the images with hands or hand-held tools.

DETAILED DESCRIPTION OF THE INVENTION

The new and unique inventions described in this document build upon prior art by taking the current state of real-time computer-generated 3D computer graphics, 3D sound, tactile and biofeedback computer-human interfaces to a whole new level of reality and simplicity. More specifically, these new inventions enable real-time computer-generated 3D simulations to coexist in physical space and time with the end-user and with other real-world physical objects. This capability dramatically improves upon the end-user's visual, auditory and tactile computing experience by providing direct physical interactions with 3D computer-generated objects and sounds. By the addition of biofeedback, the interaction with users becomes a two way street, meaning the computer system can be adjusted for a particular user, and the system can influence the user's perspective and behaviors.

The present invention discloses a horizontal perspective workstation comprising at least two display surfaces, one of which is capable of projecting three dimensional illusions based on horizontal perspective projection.

Figure 1:
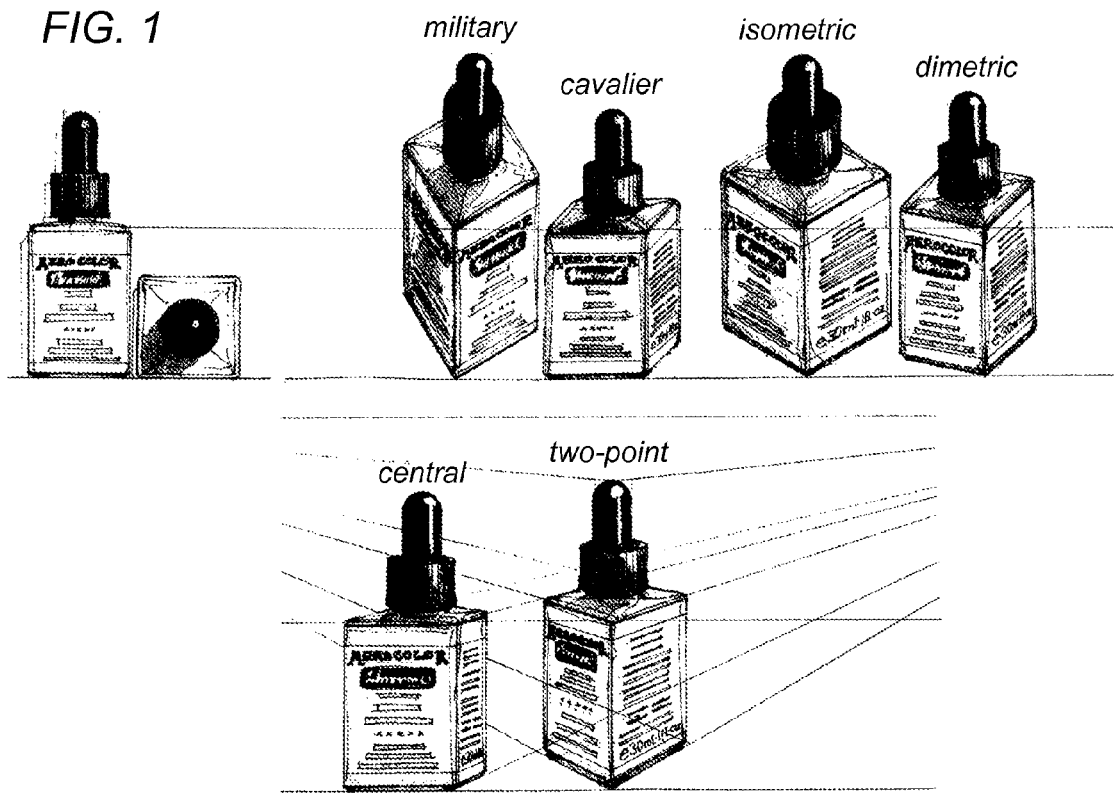
FIG. 1 shows the various perspective drawings.
Figure 2:
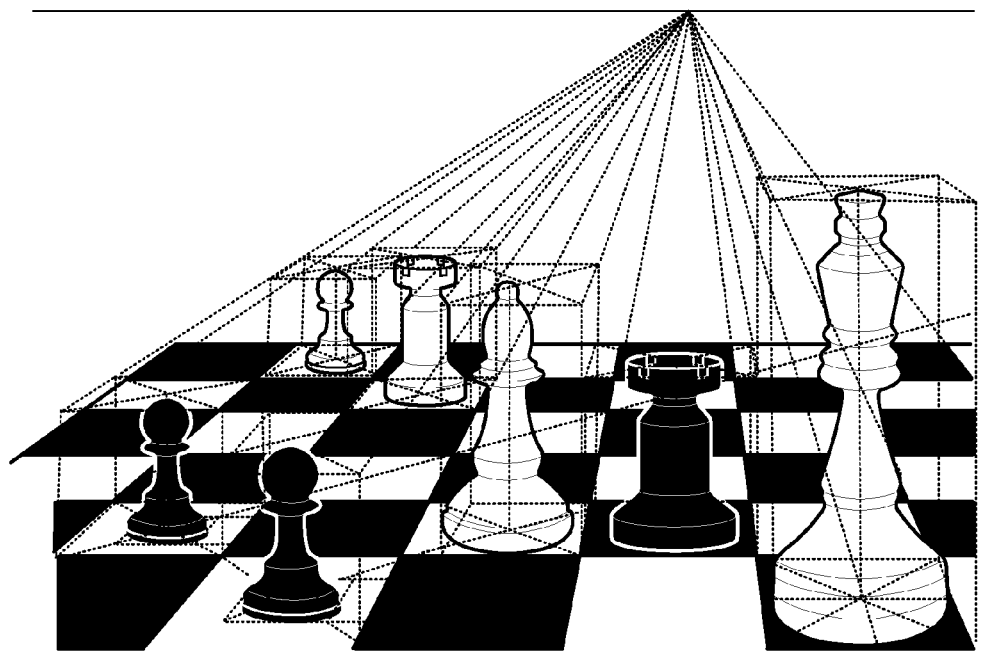
FIG. 2 shows a typical central perspective drawing.
Figure 3:
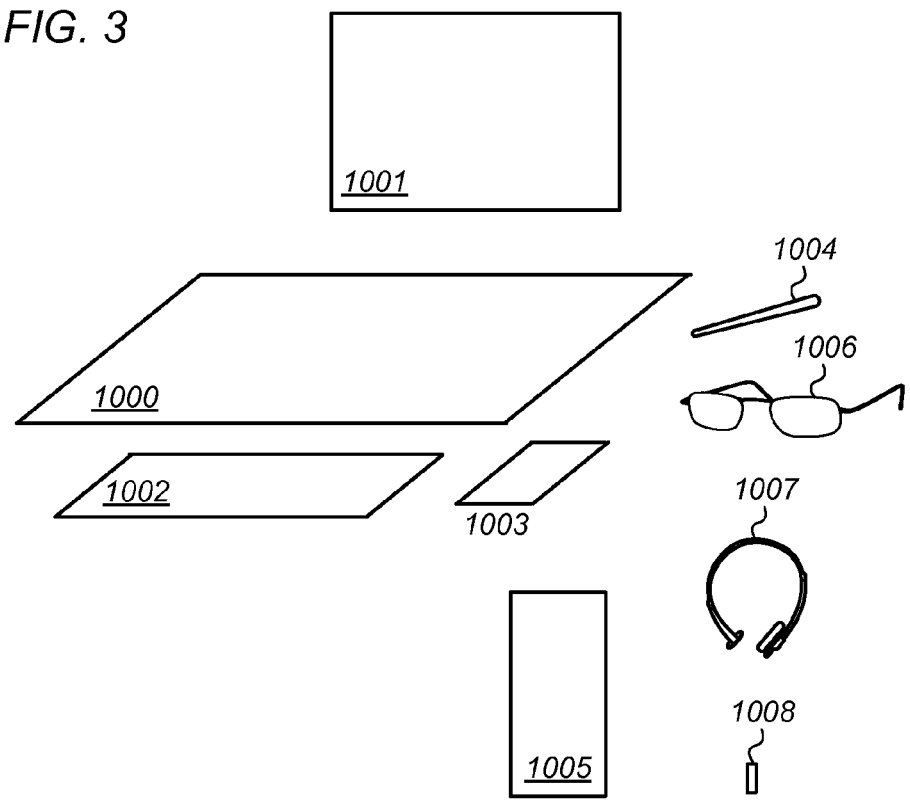
FIG. 3 shows an embodiment of the present invention horizontal perspective workstation.

FIG. 3 shows an embodiment of the present invention horizontal perspective workstation, comprising two display surfaces, a display surface 1000 being substantially horizontal for displaying 3D horizontal perspective images, and a display surface 1001 being substantially vertical for conventional images such as 2D images or central perspective images. The horizontal and vertical display surfaces can be any display surfaces, for example, a CRT (cathode ray tube) monitor, a LCD (liquid crystal display) monitor, a front projection or a back projection screen or surface with a plurality of projectors. The horizontal perspective workstation further comprises a computer system 1005 with standard peripheral devices such as a keyboard 1002, a mouse 1003, a trackball, a stylus 1004, a tablet, a camera, a scanner, or a printer. The horizontal perspective workstation further comprises a stereoscopic lens 1006 for viewing stereoscopic 3D images from the horizontal perspective display 1000. The eyewear 1006 includes linear polarizing lenses where the polarizing angle between the two eyes is 90°. If the vertical display is also polarized as in the case of LCD monitor, the polarization needs to be adjusted so that both eyes can see the vertical images. For example, if the LCD display is 0° polarized, then the left eye could be −45° polarized and the right eye +45° polarized.

The horizontal perspective workstation can further comprise a binaural or 3D audio system such as a headphone 1007 to provide realistic sound simulation. The horizontal perspective workstation can also comprise various biofeedback devices such as brain wave electrode 1008, blood pressure, heart beat, respiration, perspiration, skin conductance, body temperature, muscle tension measurements and simulators for inputs and output with the users.

Further, the horizontal perspective workstation can comprise curvilinear blending display surfaces to merge the various images. The horizontal perspective workstation can adjust the images to accommodate the position of the viewer. By changing the displayed images to keep the camera eyepoint of the horizontal perspective and central perspective images in the same position as the viewer's eye point, the viewer's eye is always positioned at the proper viewing position to perceive the three dimensional illusion, thus minimizing the viewer's discomfort and distortion. The display can accept manual input such as a computer mouse, trackball, joystick, tablet, etc. to re-position the horizontal perspective images. The display can also automatically re-position the images based on an input device automatically providing the viewer's viewpoint location. The horizontal perspective workstation can provide a simulator system by allowing the user to manipulate the images with hands or hand-held tools.

Figure 4A:
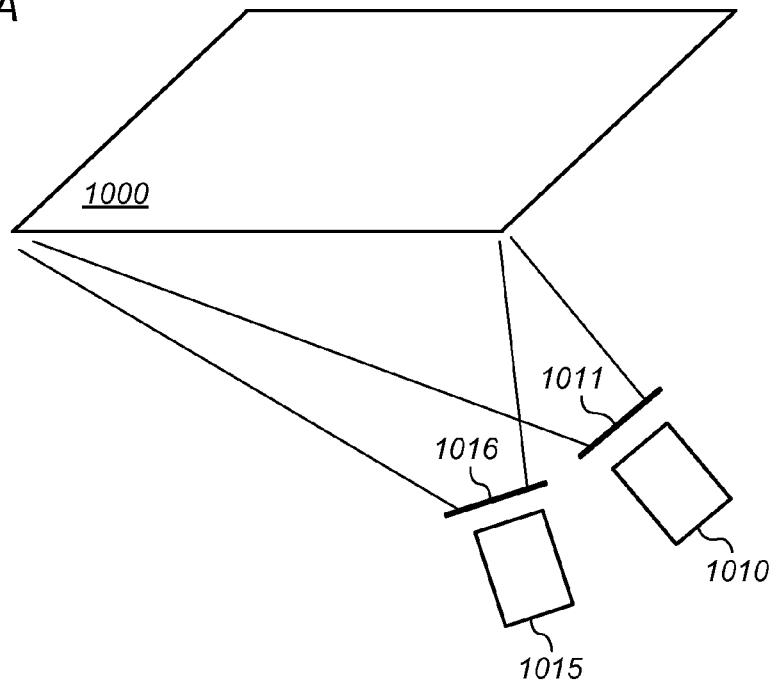
FIGS. 4A and 4B show different embodiments of the horizontal perspective display.
Figure 4B:
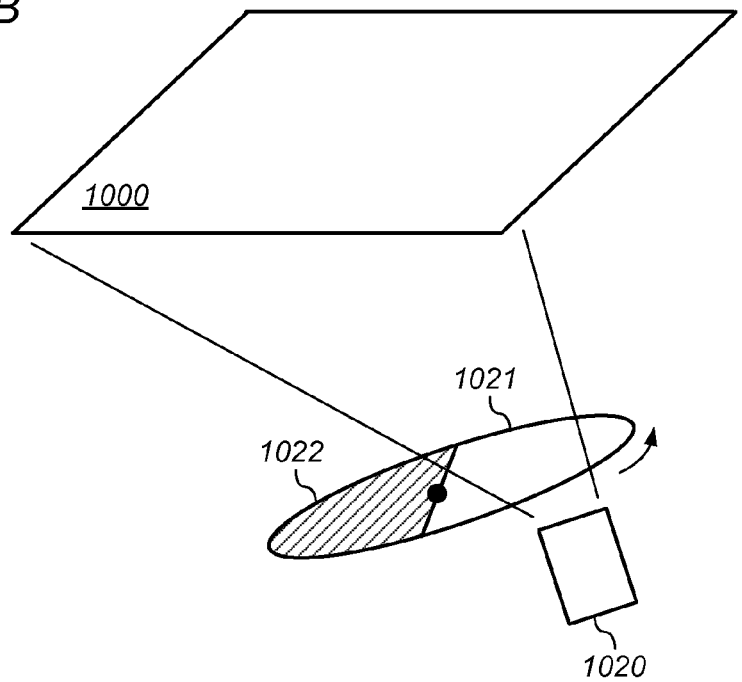

FIG. 4A shows a projector setup for the horizontal perspective display 1000. Two projectors 1010 and 1015 are calibrated to project horizontal perspective image onto the display surface 1000. The projectors are polarized with a pair of polarizing lenses 1011 and 1016 for stereoscopic image display. FIG. 4B shows another embodiment of a projector setup for the horizontal perspective display 1000 using only one projector 1020. A polarizing wheel comprising 2 polarized lenses sections 1021 and 1022 are synchronizedly spinned with the projected images. The use of one projector would save the adjustment time needed for the two projector system.

Polarizing left and right images is the preferred method of stereoscopic display since it is simple and effective. Together with the polarized left and right images, the user will need to wear eyewear that synchronizes the eyes with the displayed images. For example, if the left image is 0° linearly polarized, the right image will need to be 90° linearly polarized to ensure a complete block out of the left image to the right image and vice versa. The eyewear correspondingly carries a 0° linearly polarized for the left eye and a 90° linearly polarized for the right eye.

For stereoscopic display, the present invention comprises 3 displays, one vertical display, one left horizontal display and one right horizontal display, with the left and right horizontal display showing sequentially on the horizontal surface. If the vertical display is linearly polarized, as in the case of LCD display for improving screen picture quality, the polarizing property of the three displays will need to be synchronized to ensure proper effect. In general, the left/right horizontal display is viewable only by the left/right eye respectively, and the vertical display is viewable by both eyes. Thus, in the above example, if the left/right image is 0°/90° linearly polarized respectively, the linearly polarized vertical display would be about 45° polarized to provide similar quality to both eyes. Normally, the polarized property of the vertical display is first determined based on the chosen monitor, and then the left/right polarized property is selected so that the left/right eye see the vertical image plus only the left/right image respectively. If the vertical image is linear polarized, for example, 0° linearly polarized, the left/right image can be selected to be +/−45° (or) −/+45° linearly polarized respectively. The left/right image can also be selected to be left/right (or right/left) circularly or elliptically polarized. The left/right eye of the user's eyewear will be polarized to correspond with the left/right image respectively.

Projection screen display is the preferred method for the horizontal display since it easily allows the polarizing left and right images. Back projection is also preferred over front projection since it offers control over the environment and no interference from the user. However, while the front projection screen requires high reflection with no transmission, the back projection screen requires high transmission with no reflection and with a proper amount of diffusion since diffusion is directly related to the brightness in a back projection system. Since horizontal perspective images are viewed at a nominally 45° angle, the diffusion property of the back projection screen is markedly different from the conventional back projection screen where the images are viewed head on. Thus, a diffusion amount of at least 30° is needed for the back projection screen with 45° diffusion is preferred for a proper render of polarized left and right images. Too little diffusion will provide a brighter screen but with a lot of interference between the polarized left and right images. Too much diffusion will make the screen too dark.

The above discussion is just an example of the present invention horizontal perspective workstation. There are various obvious variations, for example, the horizontal perspective display can be a LCD monitor or a CRT monitor, and the stereoscopic viewing can be accomplished with shutter glasses or lenticular methods.

Horizontal perspective is a little-known perspective, sometimes called "free-standing anaglyph", "phantogram", or "projective anaglyph". Normally, as in central perspective, the plane of vision, at right angle to the line of sight, is also the projected plane of the picture, and depth cues are used to give the illusion of depth to this flat image. In horizontal perspective, the plane of vision remains the same, but the projected image is not on this plane. It is on a plane angled to the plane of vision. Typically, the image would be on the ground level surface. This means the image will be physically in the third dimension relative to the plane of vision. Thus, horizontal perspective can be called horizontal projection.

In horizontal perspective, the object is to separate the image from the paper, and fuse the image to the three dimensional object that projects the horizontal perspective image. Thus, the horizontal perspective image must be distorted so that the visual image fuses to form the free standing three dimensional figure. It is also essential the image is viewed from the correct eye points, otherwise the three dimensional illusion is lost. In contrast to central perspective images which have height and width and project an illusion of depth, and therefore the objects are usually abruptly projected and the images appear to be in layers, the horizontal perspective images have actual depth and width and illusion gives them height, and therefore there is usually a graduated shifting so the images appear to be continuous.

Figure 5A:
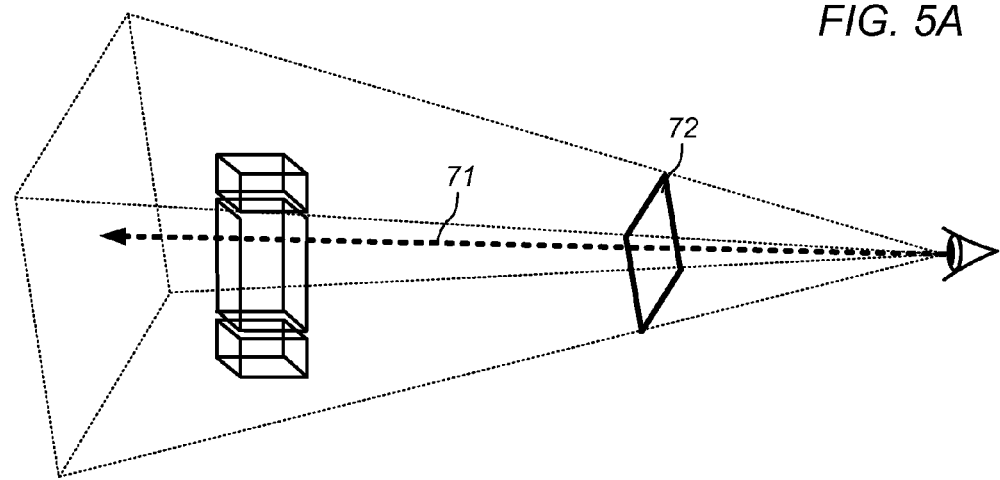
FIG. 5 shows the comparison of central perspective (Image A) and horizontal perspective (Image B).
Figure 5B:
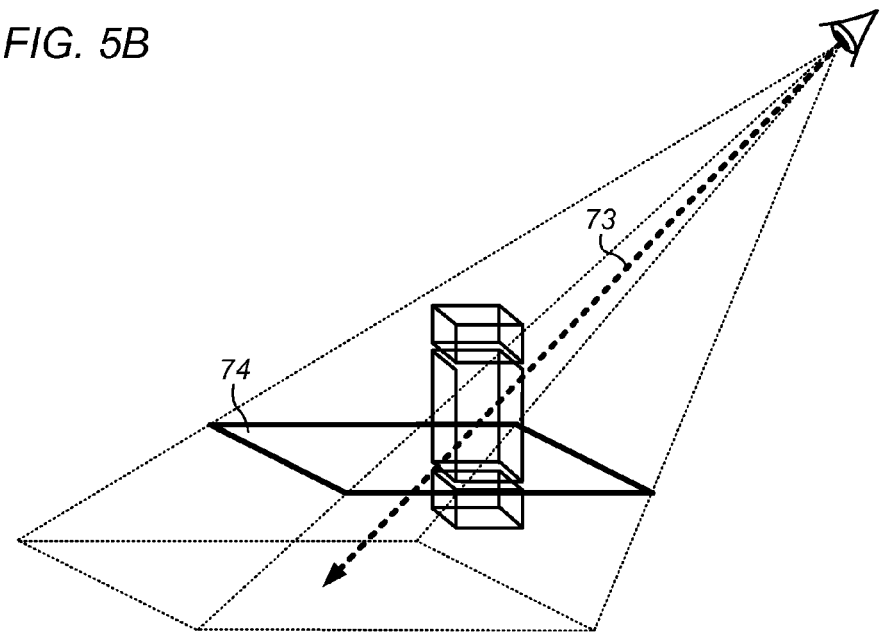

FIG. 5 compares key characteristics that differentiate central perspective and horizontal perspective. Image A shows key pertinent characteristics of central perspective, and Image B shows key pertinent characteristics of horizontal perspective.

In other words, in Image A, the real-life three dimensional object (three blocks stacked slightly above each other) was drawn by the artist closing one eye, and viewing along a line of sight perpendicular to the vertical drawing plane. The resulting image, when viewed vertically, straight on, and through one eye, looks the same as the original image.

In Image B, the real-life three dimensional object was drawn by the artist closing one eye, and viewing along a line of sight 45° to the horizontal drawing plane. The resulting image, when viewed horizontally, at 45° and through one eye, looks the same as the original image.

One major difference between the central perspective shown in Image A and the horizontal perspective shown in Image B is the location of the display plane with respect to the projected three dimensional image. In the horizontal perspective of Image B, the display plane can be adjusted up and down, and therefore the projected image can be displayed in the open air above the display plane, i.e., a physical hand can touch (or more likely pass through) the illusion, or it can be displayed under the display plane, i.e., one cannot touch the illusion because the display plane physically blocks the hand. This is the nature of horizontal perspective, and as long as the camera eyepoint and the viewer eyepoint are at the same place, the illusion is present. In contrast, in central perspective of Image A, the three dimensional illusion is likely to be only inside the display plane, meaning one cannot touch it. To bring the three dimensional illusion outside of the display plane to allow the viewer to touch it, the central perspective would need an elaborate display scheme such as surround image projection and large volume.

Figure 6:
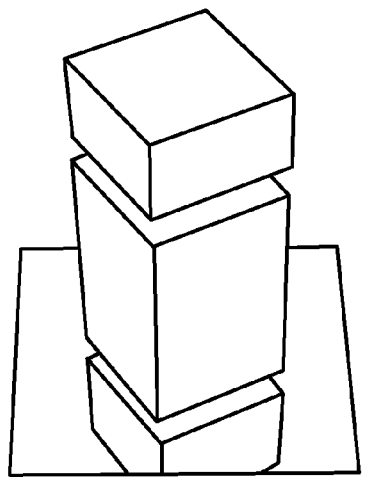
FIG. 6 shows the central perspective drawing of three stacking blocks.
Figure 7:
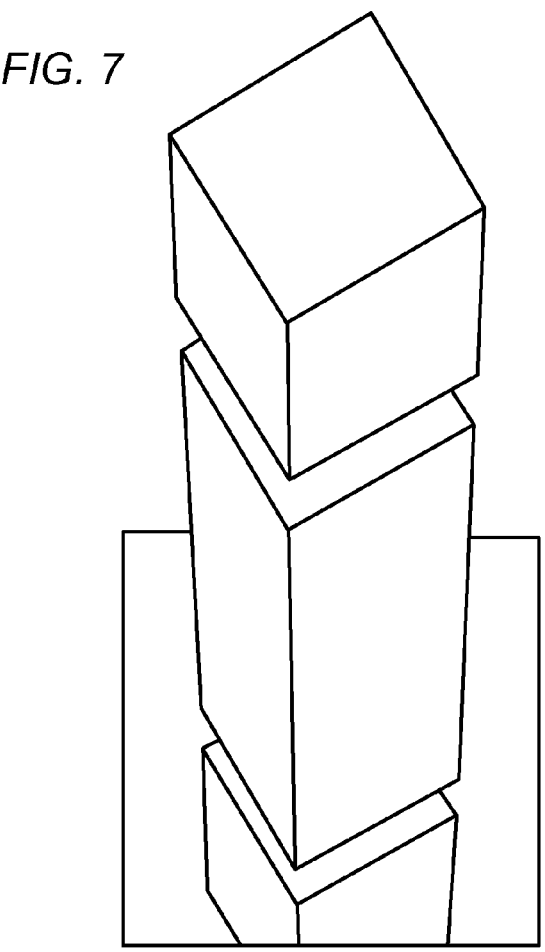
FIG. 7 shows the horizontal perspective drawing of three stacking blocks.

FIGS. 6 and 7 illustrate the visual difference between using central and horizontal perspective. To experience this visual difference, first look at FIG. 6, drawn with central perspective, through one open eye. Hold the piece of paper vertically in front of you, as you would a traditional drawing, perpendicular to your eye. You can see that central perspective provides a good representation of three dimensional objects on a two dimension surface.

Now look at FIG. 7, drawn using horizontal perspective, by sifting at your desk and placing the paper lying flat (horizontally) on the desk in front of you. Again, view the image through only one eye. This puts your one open eye, called the eye point at approximately a 45° angle to the paper, which is the angle that the artist used to make the drawing. To get your open eye and its line-of-sight to coincide with the artist's, move your eye downward and forward closer to the drawing, about six inches out and down and at a 45° angle. This will result in the ideal viewing experience where the top and middle blocks will appear above the paper in open space.

Again, the reason your one open eye needs to be at this precise location is because both central and horizontal perspective not only define the angle of the line of sight from the eye point; they also define the distance from the eye point to the drawing. This means that FIGS. 6 and 7 are drawn with an ideal location and direction for your open eye relative to the drawing surfaces. However, unlike central perspective where deviations from position and direction of the eye point create little distortion, when viewing a horizontal perspective drawing, the use of only one eye and the position and direction of that eye relative to the viewing surface are essential to seeing the open space three dimension horizontal perspective illusion.

Figure 8:
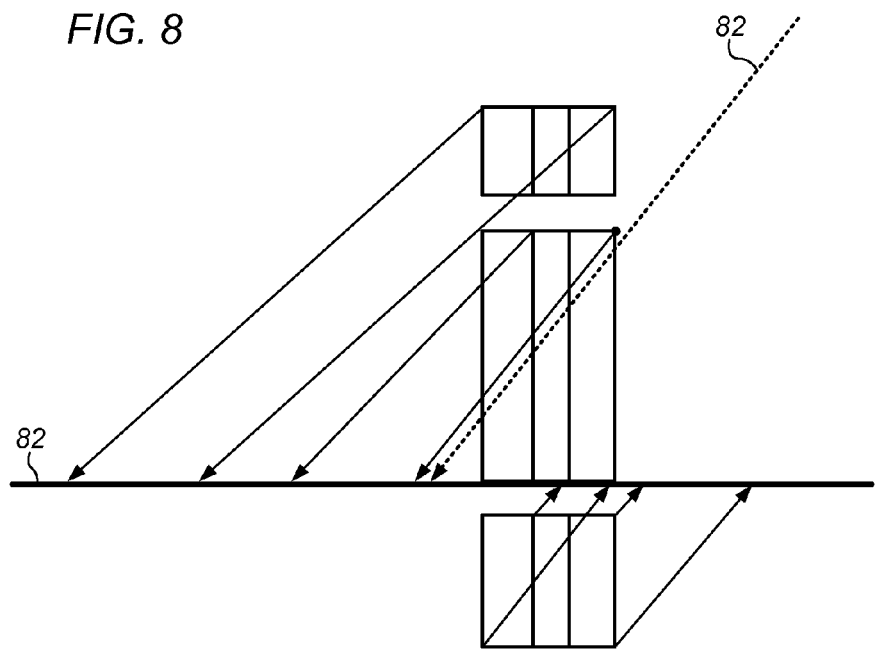
FIG. 8 shows the method of drawing a horizontal perspective drawing.

FIG. 8 is an architectural-style illustration that demonstrates a method for making simple geometric drawings on paper or canvas utilizing horizontal perspective. FIG. 8 is a side view of the same three blocks used in FIGS. 7. It illustrates the actual mechanics of horizontal perspective. Each point that makes up the object is drawn by projecting the point onto the horizontal drawing plane. To illustrate this, FIG. 8 shows a few of the coordinates of the blocks being drawn on the horizontal drawing plane through projection lines. These projection lines start at the eye point (not shown in FIG. 8 due to scale), intersect a point on the object, then continue in a straight line to where they intersect the horizontal drawing plane, which is where they are physically drawn as a single dot on the paper. When an architect repeats this process for each and every point on the blocks, as seen from the drawing surface to the eye point along the line-of-sight, the horizontal perspective drawing is complete, and looks like FIG. 7.

Notice that in FIG. 8, one of the three blocks appears below the horizontal drawing plane. With horizontal perspective, points located below the drawing surface are also drawn onto the horizontal drawing plane, as seen from the eye point along the line-of-site. Therefore when the final drawing is viewed, objects not only appear above the horizontal drawing plane, but may also appear below it as well, giving the appearance that they are receding into the paper. If you look again at FIG. 7, you will notice that the bottom box appears to be below, or go into, the paper, while the other two boxes appear above the paper in open space.

The generation of horizontal perspective images requires considerably more expertise to create than central perspective images. Even though both methods seek to provide the viewer the three dimension illusion that resulted from the two dimensional image, central perspective images produce directly the three dimensional landscape from the viewer or camera point. In contrast, the horizontal perspective image appears distorted when viewing head on, but this distortion has to be precisely rendered so that when viewing at a precise location, the horizontal perspective produces a three dimensional illusion.

One of the characteristics of horizontal perspective display is the projection onto the open space, and thus allowing a direct "touching" of the displayed images. Since the images are only projected images, there is no physical manifestation, and thus "touching" is not physically touching, but more like ghost touching, meaning the user can see by eyes and not feel by hands that the images are touched. The horizontal perspective images can also be displayed under the displayed surface, and thus a user cannot "touch" this portion. This portion can only be manipulated indirectly via a computer mouse or a joystick.

To synchronize the displayed images with the reality, the location of the display surface needs to be known to the computer. For a projection display, the projection screen is the display surface, but for a CRT computer monitor, the display surface is typically the phosphor layer, normally protected by a layer of glass. This difference will need to be taken into account to ensure accurate mapping of the images onto the physical world.

One element of horizontal perspective projection is the camera eyepoint, which is the focus of all the projection lines. The camera eyepoint is normally located at an arbitrary distance from the projection plane and the camera's line-of-sight is oriented at a 45° angle looking through the center. The user's eyepoint will need to coincide with the camera eyepoint to ensure minimum distortion and discomfort.

Figure 9:
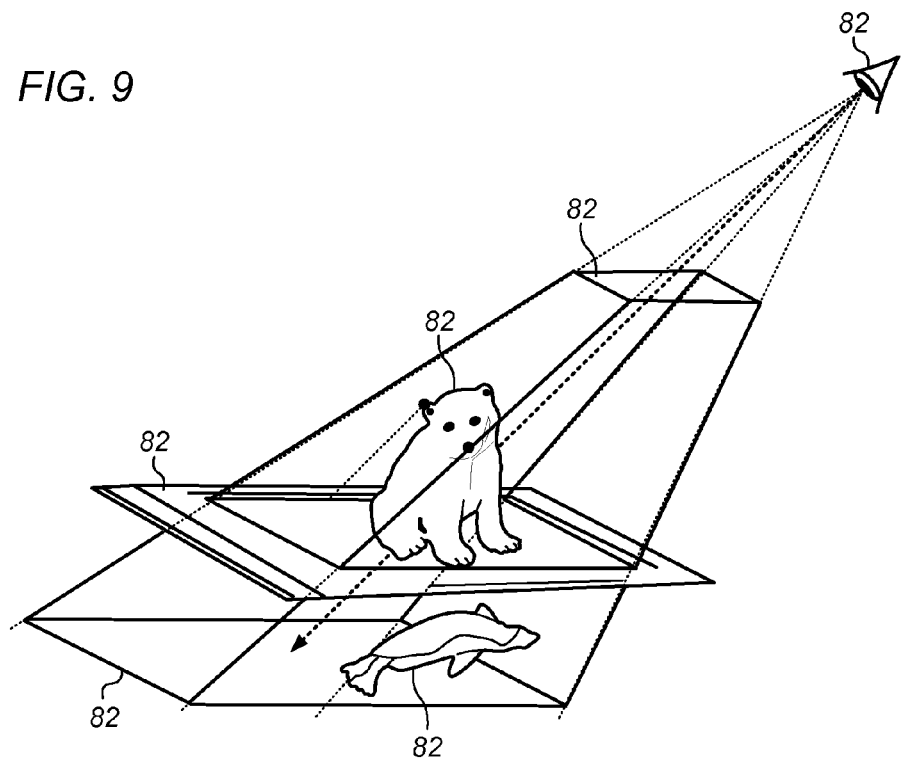
FIG. 9 shows the horizontal perspective mapping of a 3D object onto the projection plane.

Mathematically, the projection lines to the camera eyepoint form a 45° pyramid. FIG. 9 illustrates this pyramid, which begins at the camera eyepoint and extending to the projection plane and beyond. The portion of the pyramid above the projection plane is a hands-on volume, where users can reach their hand in and physically "touch" a simulation. The portion of the pyramid under the projection plane is an inner-access volume, where users cannot directly interact with the simulation via their hand or hand-held tools. But objects in this volume can be interacted with in the traditional sense with a computer mouse, joystick, or other similar computer peripheral.

The horizontal perspective display is preferably placed horizontally to the ground, meaning the projection plane must be at approximately a 45° angle to the end-user's line-of-sight for optimum viewing. Thus the CRT computer monitor is preferably positioned on the floor in a stand, so that the viewing surface is horizontal to the floor. This example uses a CRT-type computer monitor, but it could be any type of viewing device, placed at approximately a 45° angle to the end-user's line-of-sight.

The present invention horizontal perspective hands-on simulator employs the horizontal perspective projection to mathematically project the 3D objects to the hands-on and inner-access volumes.

The system preferably displays stereoscopic images through stereoscopic 3D computer hardware to provide the user with multiple or separate left- and right-eye views of the same simulation. Thus, stereoscopic 3D hardware devices utilize methods with glasses such as anaglyph method, special polarized glasses or shutter glasses, methods without using glasses such as a parallax stereogram, a lenticular method, and mirror method (concave and convex lens).

In the anaglyph method, a display image for the right eye and a display image for the left eye are respectively superimpose-displayed in two colors, e.g., red and blue, and observation images for the right and left eyes are separated using color filters, thus allowing a viewer to recognize a stereoscopic image. In polarized glasses method, the left eye image and the right eye image are separated by the use of mutually extinguishing polarizing filters such as orthogonally linear polarizer, circular polarizer, and elliptical polarizer. Another way for stereoscopic display is the image sequential system. In such a system, the images are displayed sequentially between left eye and right eye images rather than superimposing them upon one another, and the viewer's lenses are synchronized with the screen display to allow the left eye to see only when the left image is displayed, and the right eye to see only when the right image is displayed. The shuttering of the glasses can be achieved by mechanical shuttering or with liquid crystal electronic shuttering. Other way to display stereoscopic images is by optical method. In this method, display images for the right and left eyes, which are separately displayed on a viewer using optical means such as prisms, mirror, lens, and the like, are superimpose-displayed as observation images in front of an observer, thus allowing the observer to recognize a stereoscopic image. Large convex or concave lenses can also be used where two image projectors, projecting left eye and right eye images, are providing focus to the viewer's left and right eye respectively. A variation of the optical method is the lenticular method where the images form on cylindrical lens elements or a two dimensional array of lens elements.

Figure 10:
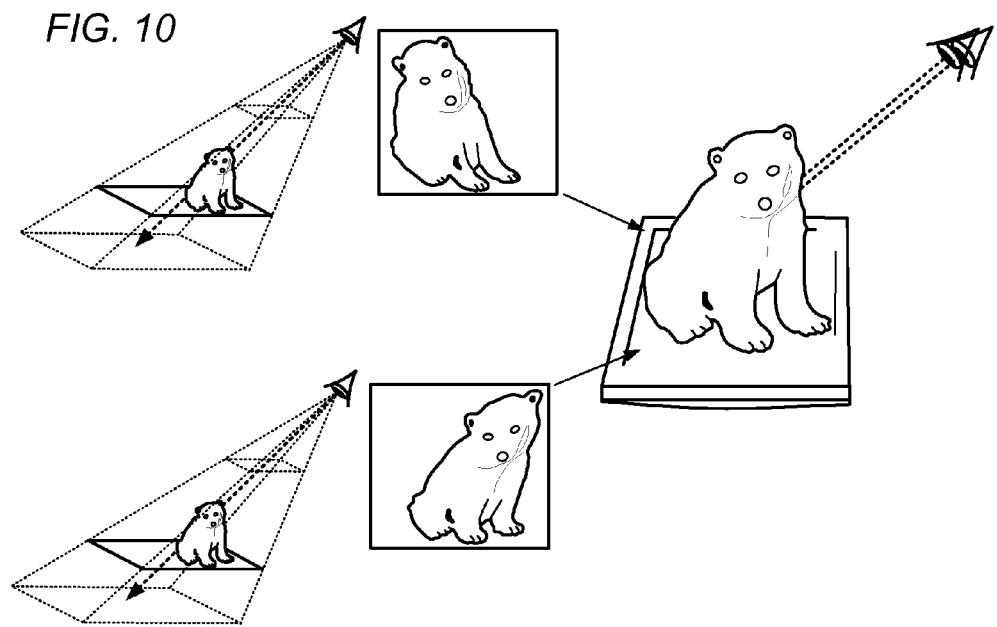
FIG. 10 shows the two-eye view.

FIG. 10 illustrates the stereoscopic displayed images of the present horizontal perspective simulator. The user sees the bear cub from two separate vantage points, i.e. from both a right-eye view and a left-eye view. These two separate views are slightly different and offset because the average person's eyes are about 2 inches apart. Therefore, each eye sees the world from a separate point in space and the brain puts them together to make a whole image.

To provide motion, or time-related simulation, the displayed images are updated frequently. This is similar to a movie projector where the individual displayed images provide the illusion of motion when the updating frequency is higher than about 24 Hz. Adding to the stereoscopic view, the simulator would need to double this frequency to update both the left and the right eye views.

The horizontal perspective display system promotes horizontal perspective projection viewing by providing the viewer with the means to adjust the displayed images to maximize the illusion viewing experience. By employing the computation power of the microprocessor and a real time display, the horizontal perspective display is capable of re-drawing the projected image to match the user's eyepoint with the camera eyepoint to ensure the minimum distortion in rendering the three dimension illusion from the horizontal perspective method. The microprocessor is configured to execute program instructions stored on a memory medium to render the three dimension illusion. The system can further comprise an image enlargement/reduction input device, or an image rotation input device, or an image movement device to allow the viewer to adjust the view of the projection images. The input device can be operated manually or automatically.

The present invention simulator further includes various computer peripherals. Typical peripherals are space globe, space tracker, and character animation devices, which are having six degrees of freedom, meaning that their coordinate system enables them to interact at any given point in an (x, y, z) space.

With the peripherals linking to the simulator, the user can interact with the display model. The simulator can get the inputs from the user through the peripherals and manipulate the desired action. With the peripherals properly matched with the physical space and the display space, the simulator can provide proper interaction and display. The peripheral tracking can be done through camera triangulation or through infrared tracking devices. Triangulation is a process employing trigonometry, sensors, and frequencies to "receive" data from simulations in order to determine their precise location in space.

The simulator can further include 3D audio devices. 3D audio also uses triangulation to send or project data in the form of sound to a specific location. By changing the amplitudes and phase angles of the sound waves reaching the user's left and right ears, the device can effectively emulate the position of the sound source. The sounds reaching the ears will need to be isolated to avoid interference. The isolation can be accomplished by the use of earphones or the like.

Figure 11:
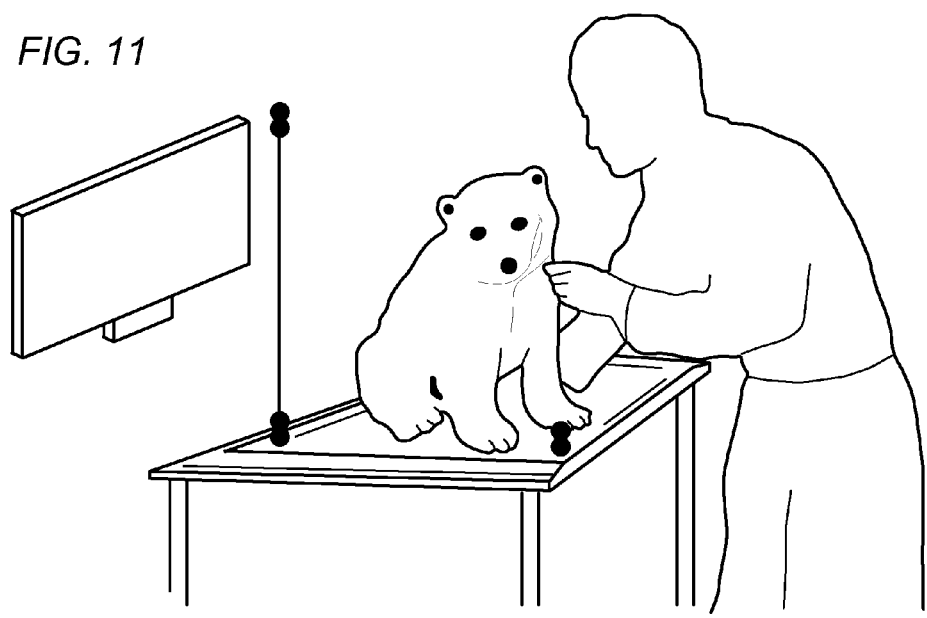
FIG. 11 shows another embodiment of the horizontal perspective workstation.

FIG. 11 shows a user looking at an image of a bear cub. Since the cub appears in open space above the viewing surface, the user can reach in and manipulate the cub by hand or with a handheld tool. It is also possible for the user to view the cub from different angles, as they would in real life. This is accomplished though the use of triangulation where the three cameras continuously send images to the computer. This camera data enables the computer to locate, track, and map the user's body and other simulations positioned within and around the computer monitor's viewing surface. The simulator then performs simulation recognition by continuously locating and tracking the user's "left and right eye" and their "line-of-sight". This enables the real-time generation of simulations based on the exact location of the end-user's left and right eye, which then allows the user to freely move his head and look around the displayed image without distortion.

This figure also includes 3D sounds emanating from the cub's mouth. This level of audio quality requires physically combining each of the three cameras with a separate speaker.

The cameras' data enables the computer to use triangulation in order to locate, track, and map the user's left and right ear. Since the computer is generating the bear cub as a computer-generated image, it knows the exact location of the cub's mouth. By knowing the exact location of the user's ears and the cub's mouth, the computer uses triangulation to send data, by modifying the spatial characteristics of the audio, making it appear that 3D sound is emanating from the cub's computer-generated mouth. The simulator then performs simulation recognition by continuously locating and tracking the end-user's "left and right ear" and their "line-of-hearing". This enables the real-time generation of sounds based on the exact location of the user's left and right ears, which then allows the user to freely move his head and still hear 3D sounds emanating from his correct location.

The simulator then performs simulation recognition by continuously locating and tracking the end-user's "left and right hand" and their "digits," i.e. fingers and thumbs. This enables the real-time generation of simulations based on the exact location of the end-user's left and right hands, allowing the user to freely interact with the displayed simulations. The simulator then performs simulation recognition by continuously locating and tracking "handheld tools". This enables the real-time generation of simulations based on the exact location of the handheld tools.

The present invention further includes more than one display comprising a horizontal perspective display together with a non-horizontal display. The multiple display system can also include a curvilinear connection display section to blend the horizontal perspective image and the other image together.

The three dimensional simulator would not be complete without a three dimensional audio or binaural simulation. Binaural simulation offers realism to the three dimensional simulation together with 3D visualization.

Similar to vision, hearing using one ear is called monoaural and hearing using two ears is called binaural. Hearing can provide the direction of the sound sources but with poorer resolution than vision, the identity and content of a sound source such as speech or music, and the nature of the environment via echoes, reverberation such as a normal room or an open field. Although we can hear with one ear, hearing with two ears is clearly better. Many of the sound cues are related to the binaural perception depending on both the relative loudness of sound and the relative time of arrival of sound at each ear. And thus, the binaural performance is clearly superior for the localization of single or multiple sound sources; for the formation of the room environment; for the separation of signals coming from multiple incoherent and coherent sound sources; and the enhancement of a chosen signal in a reverberant environment.

A 3D audio system should provide the ability for the listener to define a three-dimensional space, to position multiple sound sources and that listener in that 3D space, and to do it all in real-time, or interactively. Beside the 3D audio system, other technologies such as stereo extension and surround sound could offer some aspects of 3D positioning or interactivity. For a better 3D audio system, audio technology needs to create a life-like listening experience by replicating the 3D audio cues that the ears hear in the real world for allowing non-interactive and interactive listening and positioning of sounds anywhere in the three-dimensional space surrounding a listener.

The head tracker function is also very important to provide perceptual room constancy to the listener. In other words, when the listener moves his head around, the signals would change so that the perceived auditory world maintain its spatial position. To this end, the simulation system needs to know the head position in order to be able to control the binaural impulse responses adequately. Head position sensors are therefore provided. The impression of being immersed is of particular relevance for applications in the context of virtual reality.

The eyes and ears often perceive an event at the same time. Seeing a door close and hearing a shutting sound are interpreted as one event if they happen synchronously. If we see a door shut without a sound, or we see a door shut in front of us and hear a shutting sound to the left, we get alarmed and confused. In another scenario, we might hear a voice in front of us and see a hallway with a corner; the combination of audio and visual cues allows us to figure out that a person might be standing around the corner. Together, synchronized 3D audio and 3D visual cues provide a very strong immersion experience. Both 3D audio and 3D graphics systems can be greatly enhanced by such synchronization.

The horizontal perspective workstation can also comprise various biofeedback devices for user's inputs and outputs. A typical biofeedback device is a brain wave electrode measurement, such as an electroencephalographic (EEG) system. The brain wave biofeedback system can be used to balance the left and the right side of the brain using binaural beat. The biofeedback device typically comprises an EEG system to measure the brain left and right electrical signals to determine the brain wave imbalance and an audio generator to generate a binaural beat to compensate for the unbalanced EEG frequencies.

Other biofeedback devices are skin conductance or galvanic skin response to measure the electrical conductance of the external skin, temperature measurement of the body, hand and foot, heart rate monitoring, and muscle tension measurement.

What is claimed is:

1. A method for presenting stereoscopic three dimensional (3D) images using a plurality of displays, comprising:
    determining a first viewpoint of a user;
    displaying a 3D image on the plurality of displays based on the first viewpoint of the user, wherein said displaying the 3D image comprises 1) displaying, according to a horizontal perspective, a first stereoscopic image on a horizontal display, and 2) displaying, according to a central perspective, a second stereoscopic image on a vertical display;
    receiving first open space user input regarding movement of a first object of the 3D image using a stylus, wherein said receiving first open space user input regarding movement of the first object of the 3D image comprises receiving location information of the stylus;
    determining a second viewpoint of the user after said displaying the 3D image, wherein the second viewpoint is determined after a change of viewpoint of the user, wherein the second viewpoint is different than the first viewpoint;
    displaying an updated 3D image on the plurality of displays based on the second viewpoint of the user and based on the user input moving the first object, wherein said displaying the updated 3D image comprises 1) displaying, according to the horizontal perspective, an updated first stereoscopic image on the horizontal display, and 2) displaying, according to the central perspective, an updated second stereoscopic image on the vertical display.

2. The method of claim 1,
  wherein said receiving first open space user input moving the first object of the 3D image comprises receiving user input to the first stereoscopic image;
  the method further comprising:
    after said displaying the updated 3D image, receiving second open space user input to the updated second stereoscopic image moving the first object of the 3D image using the stylus.

3. The method of claim 2, wherein the first user input and the second user input are generated from a single user action manipulating the first object using the stylus.

4. The method of claim 1,
  wherein during said receiving first open space user input regarding movement of a first object of the 3D image, a first portion of the first object is displayed by the horizontal display according to the horizontal perspective;
  wherein, after said displaying the updated 3D image on the plurality of displays, the first portion of the first object is displayed by the vertical display according to the central perspective.

5. The method of claim 1, wherein the location information of the stylus is determined using camera triangulation.

6. The method of claim 1,
  wherein said displaying the 3D image comprises displaying a third stereoscopic image on a third display based on the first viewpoint of the user, wherein the third display is positioned between the first display and the second display, and wherein the third stereoscopic image blends the first stereoscopic image and the second stereoscopic image.

7. The method of claim 6, wherein the third display is configured as a curvilinear display.

8. The method of claim 1, wherein said displaying the first stereoscopic image and said displaying the updated first stereoscopic image is based on a location of the first display and comprises compensating for a protective layer of the first display.

9. The method of claim 1, wherein said determining the first viewpoint of the user comprises determining a position of the user's left eye and determining a position of the user's right eye.

10. The method of claim 1, further comprising:
  providing first binaural audio corresponding to the 3D image based on the first viewpoint of the user; and
  providing second binaural audio based on the second viewpoint of the user.

11. The method of claim 1, further comprising:
  determining biological conditions of the user;
  wherein said providing the second binaural audio is also based on the biological conditions of the user.

12. A non-transitory memory medium storing program instructions presenting a stereoscopic three dimensional (3D) images using a plurality of displays, wherein the program instructions are executable by a processor to:
  determine a first viewpoint of a user;
  display a 3D image on the plurality of displays based on the first viewpoint of the user, wherein said displaying the image comprises 1) displaying, according to a horizontal perspective, a first stereoscopic image on a horizontal display, and 2) displaying, according to a central perspective, a second stereoscopic image on a vertical display;
  receive first open space user input regarding movement of a first object of the 3D image using a stylus, wherein said receiving user input regarding movement of the first object of the 3D image comprises receiving location information of the stylus;
  determine a second viewpoint of the user after said displaying the 3D image, wherein the second viewpoint is different than the first viewpoint;
  display an updated 3D image on the plurality of displays based on the second viewpoint of the user and based on the user input moving the first object, wherein said displaying the updated 3D image comprises 1) displaying, according to the horizontal perspective, an updated first stereoscopic image stereoscopically on the horizontal display, and 2) displaying, according to the central perspective, an updated second stereoscopic image stereoscopically on the vertical display.

13. The non-transitory memory medium of claim 12,
  wherein the first open space user input moving the first object of the 3D image comprises user input to the first stereoscopic image;
  wherein the program instructions are further executable to:
    after said displaying the updated 3D image, receive second user input to the updated second stereoscopic image moving the first object of the 3D image using the stylus.

14. The non-transitory memory medium of claim 13, wherein the first user input and the second user input are generated from a single user action manipulating the first object using the stylus.

15. The non-transitory memory medium of claim 12,
  wherein during said receiving first open space user input regarding movement of a first object of the 3D image, a first portion of the first object is displayed by the horizontal display according to the horizontal perspective;
  wherein, after said displaying the updated 3D image on the plurality of displays, the first portion of the first object is displayed by the vertical display according to the central perspective.

16. The non-transitory memory medium of claim 12, wherein the location information of the stylus is determined using camera triangulation.

17. The non-transitory memory medium of claim 12,
  wherein said displaying the 3D image comprises displaying a third stereoscopic image on a third display based on the first viewpoint of the user, wherein the third display is positioned between the first display and the second display, and wherein the third stereoscopic image blends the first stereoscopic image and the second stereoscopic image.

18. The non-transitory memory medium of claim 17, wherein the third display is configured as a curvilinear display.

19. The non-transitory memory medium of claim 12, wherein said displaying the first stereoscopic image and said displaying the updated first stereoscopic image is based on a location of the first display and comprises compensating for a protective layer of the first display.

20. The non-transitory memory medium of claim 12, wherein said determining the first viewpoint of the user comprises determining a position of the user's left eye and determining a position of the user's right eye.

21. The non-transitory memory medium of claim 12, wherein the program instructions are further executable to:
  provide first binaural audio corresponding to the 3D image based on the first viewpoint of the user; and
  provide second binaural audio based on the second viewpoint of the user.

22. The non-transitory memory medium of claim 12, wherein the program instructions are further executable to:
   determine biological conditions of the user;
   wherein said providing the second binaural audio is also based on the biological conditions of the user.

23. A method for presenting stereoscopic three dimensional (3D) images using a plurality of displays, comprising:
   determining a current viewpoint of a user;
   receiving open space user input regarding movement of a first object of a 3D image, wherein the 3D images are rendered by the horizontal and vertical displays, wherein the user input is received using a stylus, wherein said receiving user input regarding movement of the first object of the 3D image comprises receiving current location information of the stylus;
   displaying 3D images on the horizontal and vertical displays, wherein said displaying 3D images comprises 1) displaying, according to a horizontal perspective, first stereoscopic images on the horizontal display, and 2) displaying, according to a central perspective, second stereoscopic images on the vertical display;
   wherein said displaying the 3D images comprises dynamically updating the 3D images on the horizontal and vertical displays based on the current viewpoint of the user and based on the current location information of the stylus.

24. A method for presenting stereoscopic three dimensional (3D) images using a plurality of displays, comprising:
   determining a current viewpoint of a user;
   receiving user input regarding movement of a first object of a 3D image rendered by the horizontal and vertical displays, wherein the user input is received using a stylus positioned in open space, wherein said receiving user input regarding movement of the first object of the image comprises receiving current location information of the stylus;
   displaying 3D images on the horizontal and vertical displays, wherein said displaying 3D images comprises 1) displaying, according to a horizontal perspective, first stereoscopic images on the horizontal display, and 2) displaying, according to a central perspective, second stereoscopic images on the vertical display;
   wherein the 3D images are displayed on the horizontal and vertical displays based on the current viewpoint of the user and based on the current location information of the stylus.

25. A method for presenting stereoscopic three dimensional (3D) images using a plurality of displays, comprising:
   determining a first viewpoint of a user;
   displaying a first stereoscopic image on a first display based on the first viewpoint of the user, wherein the first display is configured as a horizontal display, and wherein said displaying the first stereoscopic image on the first display is performed using a horizontal perspective;
   displaying a second stereoscopic image on a second display based on the first viewpoint of the user, wherein the second display is configured as a vertical display, and wherein said displaying the second stereoscopic image on the second display is performed using a central perspective;
   receiving open space user input moving a first object of the image using an open space manipulating handheld tool, wherein said moving the first object updates the first stereoscopic image, and wherein said receiving user input moving the first object comprises determining the location of the handheld tool;
   determining a second viewpoint of the user after said displaying the first stereoscopic image and the second stereoscopic image, wherein the second viewpoint is different than the first viewpoint;
   displaying an updated first stereoscopic image on the first display based on the second viewpoint of the user and based on the user input moving the first object, and wherein said displaying the updated first stereoscopic image on the first display is performed using the horizontal perspective;
   displaying an updated second stereoscopic image on the second display based on the second viewpoint of the user and based on the user input moving the first object, and wherein said displaying the updated second stereoscopic image on the second display is performed using the central perspective.

26. A method for presenting stereoscopic three dimensional (3D) images using a plurality of displays, comprising:
   determining a first viewpoint of a user;
   displaying 3D images on the plurality of displays based on the first viewpoint of the user, wherein said displaying the 3D images comprises 1) displaying, according to a horizontal perspective, first stereoscopic images on a horizontal display, and 2) displaying, according to a central perspective, second stereoscopic images on a vertical display;
   receiving open space user input to the first stereoscopic image moving a first object using an open space manipulating handheld tool, wherein said receiving user input comprises determining the location of the handheld tool;
   determining a second viewpoint of the user after said displaying the 3D images;
   displaying updated 3D images on the plurality of displays based on the second viewpoint of the user and based on the user input moving the first object, wherein said displaying the image comprises 1) displaying, according to the horizontal perspective, updated first stereoscopic images on the horizontal display, and 2) displaying, according to the central perspective, updated second stereoscopic images on the vertical display;
   after said displaying the updated images, receiving open space user input to the updated second stereoscopic image moving the first object of the image using the handheld tool.

27. A system for presenting stereoscopic images using a plurality of displays, comprising:
   a processor;
   an input device configured to provide information to the processor indicating a current viewpoint of the user;
   a first display coupled to the processor, wherein the first display is configured as a horizontal display;
   a second display coupled to the processor, wherein the second display is configured as a vertical display;
   a stylus configured to communicate with the processor, wherein the stylus is configured for use by a user to manipulate objects displayed by the first and/or second display, wherein the stylus is configured to provide current information regarding object manipulation to the processor;
   a memory medium coupled to the processor which stores program instructions executable to:
      configure the first display to display stereoscopic images according to a horizontal perspective and based on 1) the current viewpoint of the user and 2) the current information regarding object manipulation;
      configure the second display to display stereoscopic images according to a central perspective and based on 1) the current viewpoint of the user and 2) the current information regarding object manipulation.

28. The system of claim 27, wherein the stereoscopic images of the horizontal perspective and the stereoscopic images of the central perspective form a 3D image.

29. The system of claim 28, wherein the program instructions are executable to:
determine a first viewpoint of a user using the input device;
configure the first and second displays to display stereoscopic images of the 3D image based on the first viewpoint of the user;
receive first open space user input regarding movement of a first object of the 3D image using the stylus;
determine a second viewpoint of the user after displaying the stereoscopic images of the 3D image, wherein the second viewpoint is determined after a change of viewpoint of the user, wherein the second viewpoint is different than the first viewpoint;
configure the first and second displays to display updated stereoscopic images of an updated 3D image based on the second viewpoint of the user and based on the user input moving the first object.

30. The system of claim 29,
wherein said receiving first open space user input moving the first object of the 3D image comprises receiving user input to the stereoscopic images of the first display using the stylus;
wherein, after displaying the updated 3D image, the program instructions are executable to:
receive second open space user input to the updated stereoscopic images of the second display, wherein the second open space user input moves the first object of the 3D image using the stylus.

31. The system of claim 29, wherein the first user input and the second user input are generated from a single user action manipulating the first object using the stylus.

32. The system of claim 29,
wherein during said receiving first open space user input regarding movement of the first object of the 3D image, a first portion of the first object is displayed by the first display according to the horizontal perspective;
wherein, after displaying the updated stereoscopic images of the updated 3D image on the first and second displays, the first portion of the first object is displayed by the second display according to the central perspective.

33. The system of claim 28, further comprising:
a third display positioned between the first display and the second display, wherein the program instructions are executable to configure the third display to display stereoscopic images of the 3D image based on 1) the current viewpoint of the user and 2) the current information regarding object manipulation, wherein the stereoscopic images of the third display blends the stereoscopic images of the first and second display.

34. The system of claim 33, wherein the third display is configured as a curvilinear display.

35. The system of claim 27, wherein the current information of the stylus is determined using camera triangulation.

36. The system of claim 27, wherein configuring the first display to display stereoscopic images is based on a location of the first display and comprises compensating for a protective layer of the first display.

37. The system of claim 27, wherein the input device is configured to determine a position of the user's left eye and determining a position of the user's right eye to provide information to the processor indicating a current viewpoint of the user.

38. The system of claim 27, further comprising a stereo audio output device, wherein the program instructions are further executable to:
provide binaural audio corresponding to the stereoscopic images based on the current viewpoint of the user using the stereo audio output device.

39. The system of claim 27, further comprising a biological input device configured to determine biological conditions of the user.

40. A system for presenting stereoscopic images using a plurality of displays, comprising:
a processor;
an input device configured to provide information to the processor indicating a current viewpoint of the user;
a first display coupled to the processor, wherein the first display is configured as a horizontal display, wherein the first display is configured to display stereoscopic images according to a horizontal perspective and based on the current viewpoint of the user;
a second display coupled to the processor, wherein the second display is configured as a vertical display, wherein the second display is configured to display stereoscopic images according to a central perspective and based on the current viewpoint of the user;
a handheld tool configured to communicate with the processor, wherein the handheld tool is configured for use by a user for open space manipulation of objects displayed by the first and/or second display, wherein the handheld tool is configured to provide current information regarding object manipulation;
wherein the first display and the second display are configured by the processor to display updated images based on the current viewpoint of the user and the current information received from the handheld tool regarding object manipulation by the user.

41. The system of claim 40, wherein the stereoscopic images of the first display and the stereoscopic images of the second display are of a 3D image.

42. The system of claim 41,
wherein the input device is configured to determine a first viewpoint of the user;
wherein the first display and the second display are configured to display stereoscopic images of the 3D image based on the first viewpoint of the user;
wherein the handheld tool is configured to receive first open space user input regarding movement of a first object of the 3D image;
wherein the input device is configured to determine a second viewpoint of the user after displaying the stereoscopic images of the 3D image, wherein the second viewpoint is determined after a change of viewpoint of the user, wherein the second viewpoint is different than the first viewpoint;
wherein the first and second displays are configured to display updated stereoscopic images of an updated 3D image based on the second viewpoint of the user and based on the user input moving the first object.

43. The system of claim 42,
wherein the first open space user input moving the first object of the 3D image is received based on the stereoscopic images of the first display using the handheld tool;
wherein, after displaying the updated 3D image, the handheld tool is configured to receive second open space user input to the updated stereoscopic images of the second display, wherein the second open space user input moves the first object of the 3D image.

44. The system of claim 42, wherein the first user input and the second user input are generated from a single user action manipulating the first object using the handheld tool.

45. The system of claim 42,
wherein during said receiving first open space user input regarding movement of the first object of the 3D image, a first portion of the first object is displayed by the first display according to the horizontal perspective;
wherein, after displaying the updated stereoscopic images of the updated 3D image on the first and second displays, the first portion of the first object is displayed by the second display according to the central perspective.

46. The system of claim 40, wherein the current information of the handheld tool is determined using camera triangulation.

47. The system of claim 40, further comprising:
a third display positioned between the first display and the second display, wherein the program instructions are executable to configure the third display to display stereoscopic images based on the current viewpoint of the user, wherein the stereoscopic images of the third display blends the stereoscopic images of the first and second display.

48. The system of claim 47, wherein the third display is configured as a curvilinear display.

* * * * *